G. WALTHER.

CAST METAL WHEEL.

APPLICATION FILED NOV. 3, 1920.

Reissued June 7, 1921.

15,122.

INVENTOR

George Walther,

By Paul Wood & Fauquier

ATTORNEYS

UNITED STATES PATENT OFFICE.

GEORGE WALTHER, OF DAYTON, OHIO.

CAST-METAL WHEEL.

15,122. Specification of Reissued Letters Patent. Reissued June 7, 1921.

Original No. 1,283,995, dated November 5, 1918, Serial No. 144,101, filed January 24, 1917. Application for reissue filed November 3, 1920. Serial No. 421,596.

*To all whom it may concern:*

Be it known that I, GEORGE WALTHER, a citizen of the United States of America, residing at Dayton, in the county of Montgomery and State of Ohio, have invented new and useful Improvements in Cast-Metal Wheels, of which the following is a specification.

This invention relates to certain improvements in vehicle wheels such as are specially designed for motor trucks. The object of the present invention is to provide a wheel of increased strength and durability at the rim without materially increasing the weight thereof. In such a construction the spokes may be solid, or in other words, the wheel may be built up or the spokes may be hollow and integrally united to the rim.

It is my purpose to provide a wheel which shall necessitate the minimum of expensive machining, will have a structure that is very light and that will permit of the ready removal of the core from the spokes utilized in the casting of the wheel.

Figure 2:
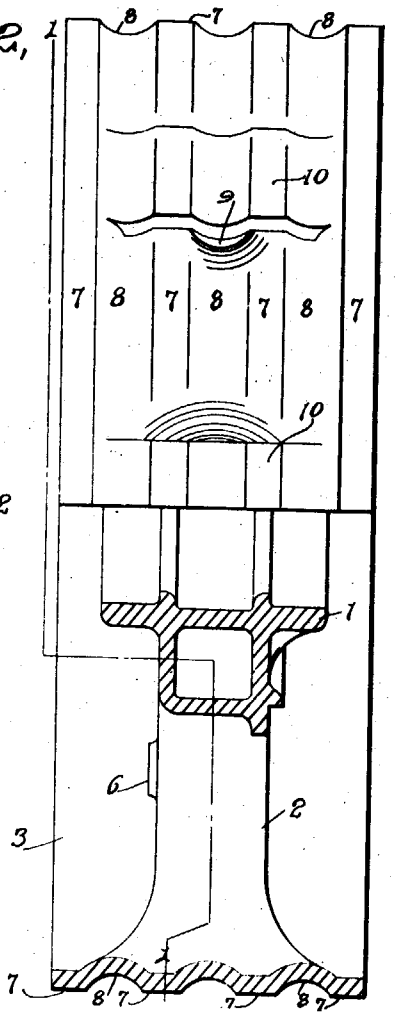
Figure 1:
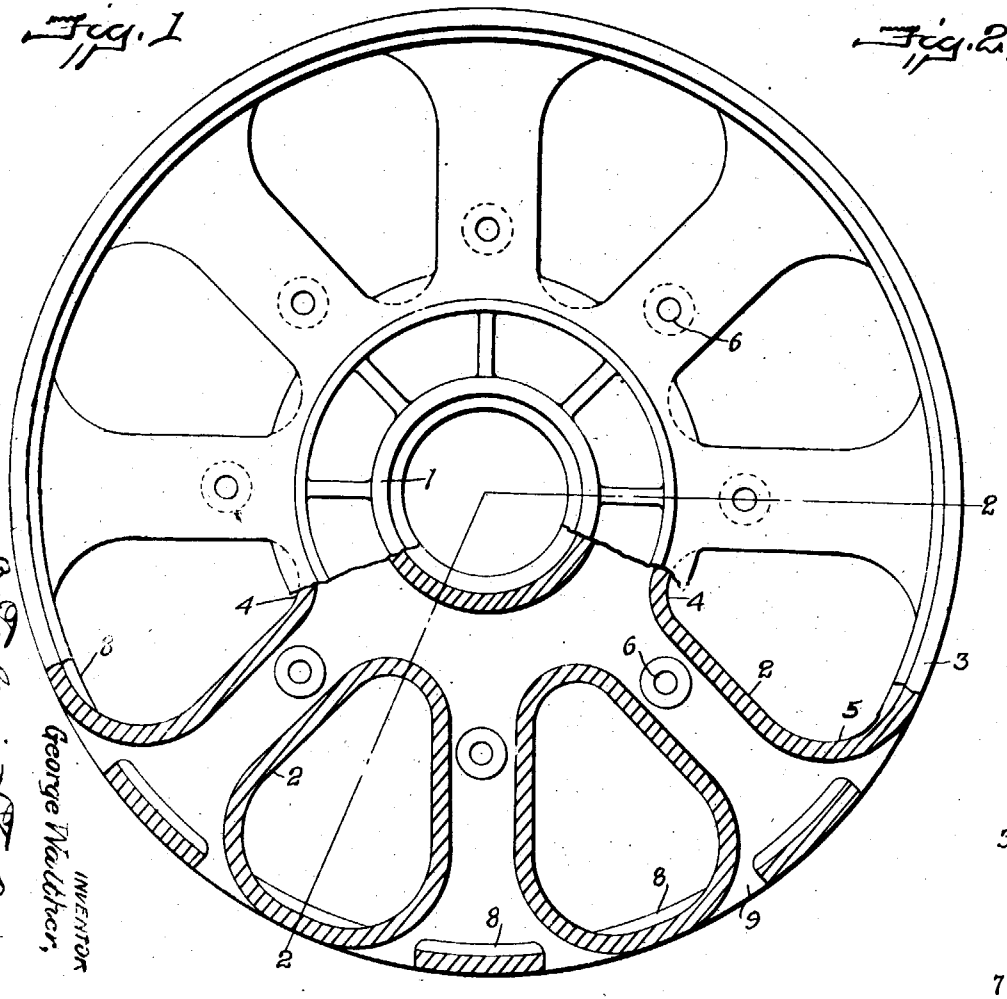

With the foregoing objects in view, the invention will be more particularly described in connection with the accompanying drawings, of which Figure 1 is a side-elevation of my improved cast steel wheel, with parts thereof broken away on the line 1—1 of Fig. 2 to facilitate the illustration. Fig. 2 is a sectional view on the line 2—2 of Fig. 1.

Referring in more particular terms, 1 designates the hub, 2 the spokes, and 3 the rim, all of which are integrally united by being made in a single steel casting. The spokes 2 are hollow as is also the hub in order that a desirable degree of lightness of the structure shall be obtained and at the same time strength shall likewise be obtained in the structure. The spokes where they leave the hub 1 extend in broadly sweeping curves 4, and also the outer ends of said spokes extend to the rim 3 in broadly sweeping curves 5. 6—6 are bolt holes for attaching a brake drum. The said spokes are provided with openings 9 through which the cores of sand used in making the casting may be removed from the spokes in a convenient manner. This also very materially lightens the structure and saves just so much expense in machining because the periphery of these wheels must be carefully machined in order to fit the tire and its rim upon the wheel. 10—10 are bridges spanning portions of the rim and forming a structure to assist in supporting the tire and in some instances the rim. These bridges are located in the neighborhood of the open end of the spoke and are formed with the depressions 8 which serve to save additional machining so that only the surfaces 7 need be machined. By the use of these supports 10 continuous supports are obviated, strength is given to the wheel sufficient for the purposes intended, and space is left for the exit of the sand from the cores used to form the wheel. It will be observed that the periphery of the wheel is corrugated with alternate raised and depressed areas, as at 7 and 8. In the drawings, three such annular depressions are shown and four annular corrugated surfaces, but it will be understood that they may vary according to the width of the rim or in accordance with the size of the depressions or conditions of foundry practice. It will also be understood that the bridges may be located in such positions as may be desired to accomplish the above purposes.

While I have shown and described certain features as constituting my invention, it will be understood that parts have been shown for purposes of illustration only, and that I do not desire to be limited to such details, as obvious modifications will occur to a person skilled in the art.

Having thus fully described my invention, what I claim as new and desire to secure by Letters Patent, is:—

1. A metal wheel, the hub, spokes and rim of which consist of one integral casting and the hub and spokes thereof being hollow, the rim being of a single thickness of metal and provided with annular corrugations throughout its circumference, substantially as described.

2. In a metal wheel, hub, spokes and a rim, spaced bridges on said rim, separated by apertures communicating with the spoke ends, said bridges having portions of their surfaces depressed below the general level of the rim.

3. In a metal wheel, a rim with portions thereof below the surface of the rim and portions level with the surface of the rim.

4. In a metal wheel, a hub, spokes and a rim, spaced bridges on said rim separated by apertures communicating with the spoke ends, said bridges having a portion of their surface level with the outer surface of the rim and a portion of their surface below said rim surface, the bridges being supported by the side walls only of the rim.

5. In a metal wheel, a hub, spokes and a rim, spaced bridges on said rim separated by apertures communicating with the spoke ends, said bridges having a plurality of corrugations disposed circumferentially parallel to one another with portions of said corrugations below the general surface of the periphery of the rim.

In testimony whereof I affix my signature.

GEORGE WALTHER.